March 9, 1948.  V. E. KOEPPEL  2,437,325

TRACTION LUGS FOR AUTOMOTIVE VEHICLES

Filed July 29, 1947  2 Sheets-Sheet 1

INVENTOR.
Vernon E. Koeppel
BY
McMorrow, Berman + Davidson
ATTORNEYS

March 9, 1948. V. E. KOEPPEL 2,437,325
TRACTION LUGS FOR AUTOMOTIVE VEHICLES
Filed July 29, 1947 2 Sheets-Sheet 2
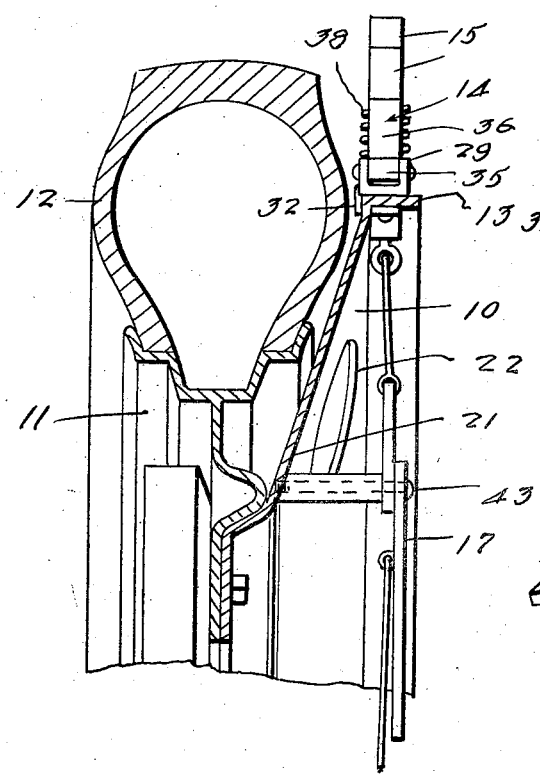
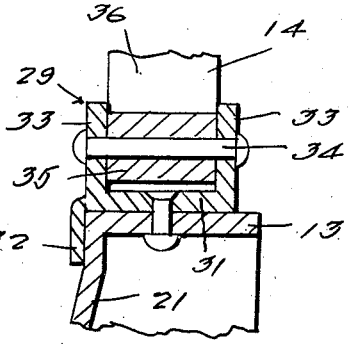
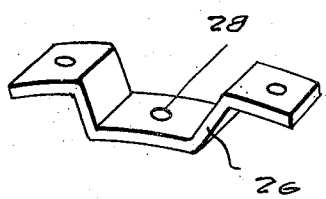
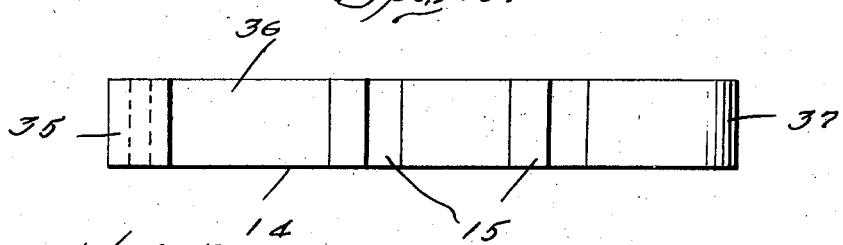
INVENTOR.
Vernon E. Koeppel
BY
McMorrow, Berman & Davidson
ATTORNEYS Patented Mar. 9, 1948

2,437,325

UNITED STATES PATENT OFFICE 2,437,325

TRACTION LUG FOR AUTOMOTIVE VEHICLES

Vernon E. Koeppel, Cato, Wis.

Application July 29, 1947, Serial No. 764,306

5 Claims. (Cl. 301—45)

This invention relates to traction lugs for automotive vehicles and more particularly to an accessory hub which is attachable to the hub of a truck, automobile or the like with improved traction devices carried by the hub which may be positioned for operation at any time or carried in retracted positions.

As will be hereinafter set forth in detail my improved traction device consists of and has for a primary object to provide a removable hub for vehicle wheels having a rim upon which any desired number of hinged lugs having teeth for engaging the ground are mounted with springs for projecting them beyond the periphery of the tire of the vehicle wheel and each lug is provided with an inwardly extending retracting element, a cable cooperating with all the retracting elements and a lever for operating upon the cable to simultaneously pull on all the retracting elements to draw the lugs into their retracted non-operative positions.

Further objects, details and advantages will appear in the following specification supplemented by the accompanying drawings forming a part thereof in illustrating a highly satisfactory form of my invention.

In the drawings:

Figure 2 is a transverse sectional view thereof taken substantially on line 2—2 of Figure 1.

Figure 4 is a detail transverse sectional view taken on line 4—4 of Figure 1.

Figure 5 is a detail edge view of the rim of the hub.

Figure 6 is a perspective view of a brace and guide element.

Figure 7 is a partial sectional view of a tooth mounting.

Figure 1:
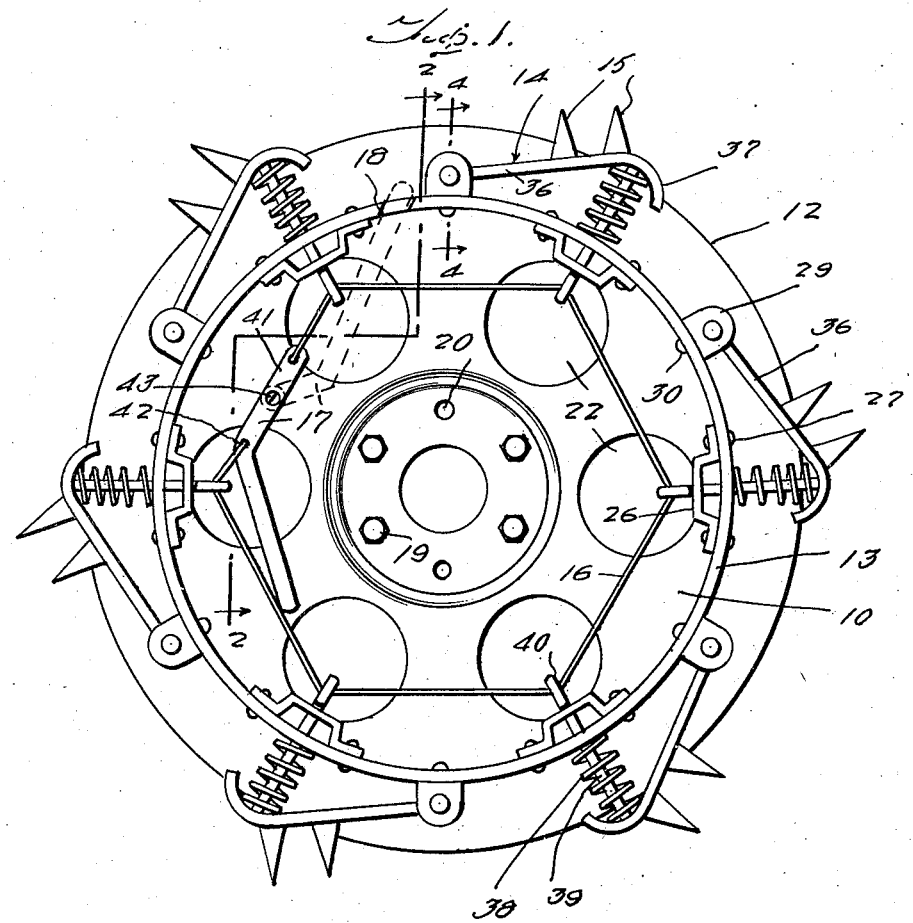
Figure 1 is a side elevation illustrating a traction device in accordance with my invention applied to a vehicle driving wheel.

Referring to the drawings in general the traction device in accordance with my invention comprises a disk 10 which is arranged for mounting and demounting on an automobile, truck or tractor disk type wheel 11 with a pneumatic tire 12. Disk 10 has a rim 13 upon which any desired number of spring pressed hinged traction elements or lugs 14, six being shown, are mounted so that their digging teeth 15 will project beyond the tire 12 for engaging mud, snow or the like. While disk 10 is demountable, it is not always desired to remove it from the wheel when not needed for traction but to carry it in readiness for use at any time. Accordingly the spring pressed traction elements 14 are arranged to be retracted by drawing on a cable 16 connected with all of them and a hand lever 17 which when swung to engage a notch 18 in the rim 13, as shown in dotted lines in Figure 1, the lugs 14 will be pulled inwardly so that their teeth 15 will be well within the periphery of the tread surface of tire 12.

In the above arrangement disk 10 is shaped to conform and cooperate with the disk wheel 11. Its central portion engages the central portion of the disk wheel which is shown as having six mounting bolts. For convenience, disk 10 may have apertures 19 through which four of the six bolts project without disengaging the bolts or nuts from the disk wheel and two bolt holes 20 through which the wheel mounting bolts project and when the nuts are placed thereon disk 10 is securely mounted in place to be turned with the driving wheel.

Figure 3:
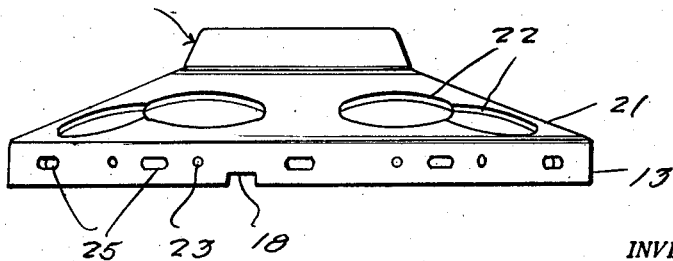
Figure 3 is a detail view of the hub and rim members.

Beyond the central mounting portion of disk 10 it is flared outwardly, as shown at 21 in Figures 2 and 3, from engagement with the other parts of the disk wheel and rim 13 at the periphery of this flared portion is spaced from the mid portion of tire 12. The flared portion 21 is provided with a plurality of apertures or openings 22 to reduce its weight and afford ready access to disk wheel, tire inflating valve and the like.

In addition to notch 18 rim 13 is provided with a plurality of rivet holes 23 and retracting rod holes 25 as indicated in Figure 3. Guide and brace elements 26 are secured by means of rivet 27 in the rivet holes 23, the guide having a retraction rod receiving aperture 28 therein as best shown in Figure 6. Hinge bearing elements 29 are secured by rivets 30 in rivet holes 24.

As shown in Figures 2 and 4, hinge-bearing elements comprise plates 31 which engage the periphery of rim 13 with portions 32 which engage the inner side of the flaring portion 21 of disk 10 and upstanding apertured ears 33 which carry traction lug pintles 34.

Traction lugs 14 have enlarged apertured ends 35 which are engaged upon pintles 34 of the hinge-bearing elements 29, and thence extend tangentially outward as plates 36 to an inwardly curved end 37. The ground engaging teeth 15 are integrally secured to the tangential plates 36 of the hinged lugs 14 so as to project beyond the tread of tire 12. These lugs and ground gripping teeth are best effective for a counter-clockwise rotation of the driving wheel illustrated in Figure 1, the rounded ends 37 releasing to some extent for reverse driving, if desired one driving wheel may have the lugs arranged as shown and another in reverse for clockwise rotation gripping tab in most cases lugs on the wheels for forward gripping is ample and rearward traction of such lugs is sufficient for the purpose.

As referred to, lugs 14 are spring pressed outwardly, compression springs 38 engaging the inner surface of the lugs and periphery of rim 13 for the purpose. Lugs 14 have guide and retraction rods 39 secured to them and extending through springs 38, rod holes 25 and 28 in the rim 13 and brace member 26 respectively and terminating within the rim with eyelets 40.

Cable 16 is threaded through each of the eyelets 40 on the inner ends of retracting rods 39, one end thereof being secured to an end of link bar 41 and the other end to a mid point 42 at the bend of lever 17. The adjacent ends of bar 41 and lever 17 are connected by a pivot element 43 in the form of a rivet, removable bolt or the like. It will be seen that when lever 17 is swung on pivot 43 so that its outer end is moved to engage notch 18 in rim 13 cable 16 will draw all of the lugs 14 to their retracted position.

Figure 7 illustrates a tooth 15 which is provided with a square shank 45 fitting snugly within a similarly shaped opening in the lug 14, with the shank threaded adjacent its outer end for connection with a nut 46. A construction of this type provides a detachable mount for the teeth to facilitate substitution of good teeth in case of damage to those originally installed in the device.

Having described a highly satisfactory form of my invention for the purpose of illustrating the principle thereof, what I claim as my invention and desire to secure by Letters Patent is:

1. Gripping traction means for driving wheels of an automotive vehicle comprising a plurality of devices, means for mounting said devices adjacent to the periphery of a driving wheel of the vehicle, a spring for each of said devices for projecting them beyond the periphery of the wheel for gripping the supporting surface for the wheel, retracting rods secured to said gripping devices extending inwardly through said springs and mounting means, said rods terminating at their inner ends with eyelets, a cable extending through said eyelets on the ends of said rods, and lever means connected with the ends of said cable for contracting the cable to be drawn on said retracting rods for drawing the gripping devices inwardly of the periphery of the wheel.

2. Traction lugs for automotive vehicles having disk-type wheels carrying resilient tires comprising a disk for cooperating with the wheel disk, means for securing the central portion of said disk to the wheel disk, said disk having a flaring portion extending outwardly from the wheel disk and tire thereon, a peripheral rim on said flared portion of the disk and adjacent to the wheel tire, bearing members at spaced intervals on the outer surfaces of said rim, lug plates hinged thereto so as to extend tangentially thereof, gripping teeth on the outer surface of said plates, and springs between said plates and the rim yieldingly projecting them so that the teeth thereon will extend into operative gripping positions beyond the periphery of the tire on the wheel.

3. Traction lugs for automotive vehicles having disk-type wheels carrying resilient tires comprising a disk for cooperating with the wheel disk, means for securing the central portion of said disk to the wheel disk, said disk having a flaring portion extending outwardly from the wheel disk and tire thereon, a peripheral rim on said flared portion of the disk and adjacent to the wheel tire, bearing members at spaced intervals on the outer surfaces of said rim, lug plates hinged thereto so as to extend tangentially thereof, gripping teeth on the outer surfaces of said plates, springs between said plates and the rim yieldingly projecting them so that the teeth thereon will extend into operative gripping positions beyond the periphery of the tire on the wheel, a guide and retracting rod secured to the inner surface of said lug plates and extending through said springs and the disk rim, said rods terminating with eyelets at their inner ends, and retracting means connected with said retracting rod eyelets within the periphery of the disk rim.

4. Traction lugs for automotive vehicles having disk-type wheels carrying resilient tires comprising a disk for cooperating with the wheel disk, means for securing the central portion of said disk to the wheel disk, said disk having a flaring portion extending outwardly from the wheel disk and tire thereon, a peripheral rim on said flared portion of the disk and adjacent to the wheel tire, bearing members at spaced intervals on the outer surfaces of said rim, lug plates hinged thereto so as to extend tangentially thereof, gripping teeth on the outer surface of said plates, springs between said plates and the rim yieldingly projecting them so that the teeth thereon will extend into operative gripping position beyond the periphery of the tire on the wheel, a guide and retracting rod secured to the inner surface of said lug plates and extending through said springs and the disk rim, said rods terminating with eyelets at their inner ends, retracting means connected with said retracting rod eyelets within the periphery of the disk rim, said retracting means comprising a cable threaded through the eyelets, and lever mechanism connected with the ends of said cable for contracting the cable to effect a retraction of the lugs.

5. Traction lugs for automotive vehicles having disk-type wheels carrying resilient tires comprising a disk for cooperating with the wheel disk, means for securing the central portion of said disk to the wheel disk, said disk having a flaring portion extending outwardly from the wheel disk and tire thereon, a peripheral rim on said flared portion of the disk and adjacent to the wheel tire, bearing members at spaced intervals on the outer surfaces of said rim, lug plates hinged thereto so as to extend tangentially thereof, gripping teeth on the outer surface of said plates, springs between said plates and the rim yieldingly projecting them so that the teeth thereon will extend into operative gripping positions beyond the periphery of the tire on the wheel, a guide and retracting rod secured to the inner surface of said lug plates and extending through said springs and the disk rim, said rods terminating with eyelets at their inner ends, retracting means connected with said retracting rod eyelets within the periphery of the disk rim, said retracting means comprising a cable threaded through the eyelets, lever mechanism connected with the ends of said cable for contracting the cable to effect a retraction of the lugs, and said rim having a notch therein engageable by the lever mechanism when it is operated to retract the lugs for holding the same against the pressure of the springs tending to project the lugs to operative position.

VERNON E. KOEPPEL.

REFERENCES CITED

The following references are of record in the file of this patent:

FOREIGN PATENTS

| Number | Country | Date |
| --- | --- | --- |
| 108,155 | Australia | Aug. 17, 1939 |
| 108,705 | Australia | Oct. 19, 1939 |